Nov. 9, 1965   B. E. SHLESINGER, JR   3,217,284
MINIATURE CONTACT ASSEMBLY FOR PLUGBOARDS
Filed Aug. 12, 1963   3 Sheets-Sheet 1

*INVENTOR*
BERNARD EDWARD SHLESINGER, JR.

Nov. 9, 1965    B. E. SHLESINGER, JR    3,217,284
MINIATURE CONTACT ASSEMBLY FOR PLUGBOARDS
Filed Aug. 12, 1963    3 Sheets-Sheet 2

INVENTOR
BERNARD EDWARD SHLESINGER, JR.
*Bernard Edward Shlesinger Jr*

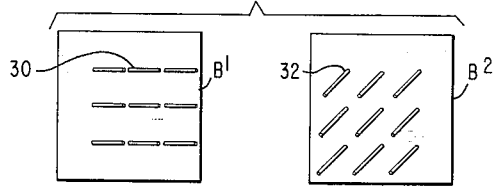
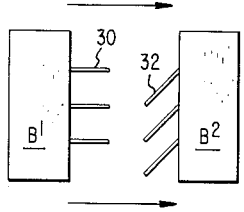
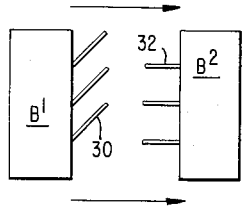
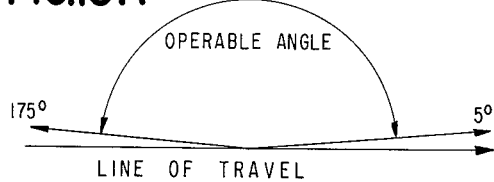
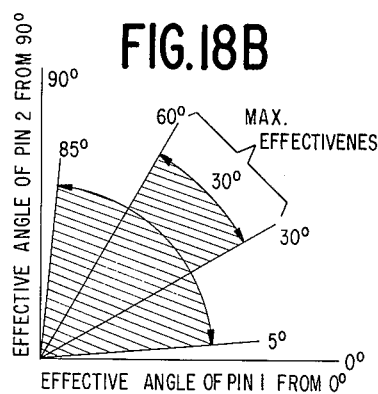
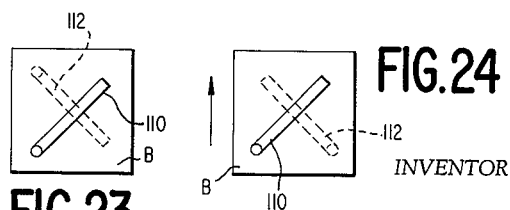

United States Patent Office 3,217,284
Patented Nov. 9, 1965

3,217,284
MINIATURE CONTACT ASSEMBLY FOR PLUGBOARDS
Bernard Edward Shlesinger, Jr., Annandale, Va., assignor to AMP Incorporated, Harrisburg, Pa.
Filed Aug. 12, 1963, Ser. No. 301,438
17 Claims. (Cl. 339—18)

This invention relates to improvements in plugboards and plugboard assemblies and the like as generally disclosed in Watts Patent No. 2,882,508 issued April 14, 1959, and Sitz Patents 2,927,295 issued March 1, 1960, and 2,975,395 issued March 14, 1961.

With miniaturization of various components in programming systems, attempts have been made to reduce the size of plugboards and their contacts. Illustrative of miniaturization of programming boards is the miniaturization of pinboards as disclosed in my copending application Serial No. 247,164 filed December 26, 1962.

It is desirable from the standpoint of weight, materials, and space, to provide a lightweight plugboard assembly which will provide maximum contact at all times, which will operate with a minimum of stress and strain upon the board, and require a minimum of pressure to place the contacts in contact position.

It is an object of this invention to provide a plugboard which can be utilized in present plugboard assemblies.

It is a further object of this invention to provide a plugboard which is lightweight.

Yet another object of this invention is to provide a plugboard assembly which when loaded does not tend to warp the board or the assembly itself. In order to do this, it is a further object of this invention to provide means which permits reduction of the pressures required to bring the contacts together.

Still another object of this invention is to provide a wiping action of the type that is taught in Sitz Patent 2,927,295; i.e. a double wipe of both contacts.

Yet another object of this invention is to provide for positive positioning of the contacts at all times quickly and efficiently.

A further object of this invention is to provide a plugboard which will maintain the pins firmly locked therein at all times and automatically position them at the desired angle for contact.

Still another object of this invention is to provide a plugboard assembly which will permit an increase in the number of contacts for the same amount of given area now presently being utilized.

Still a further object of this invention is to provide a plugboard assembly which can utilize fine wire contacts which require a minimum of machining.

These and other objects and advantages of this invention will be apparent from the following description and claims.

In the accompanying drawings which illustrate by way of example various embodiments of this invention:

FIGURE 15 illustrates diagrammatically the position the pins would take in the top and bottom boards respectively when the boards are mounted in opposed parallel relation the boards shown offset with respect to each other for purpose of illustration.

FIGURE 16 diagrammatically shows the relationship of the pins of the movable board with respect to the fixed board when viewed from one side;

FIGURE 17 diagrammatically shows the relationship of the pins of the movable board with respect to the fixed board when viewed from the next adjacent side to that shown in FIGURE 16;

FIGURE 18A illustrates the angular deviation of the pin from the line of travel when the movable board reciprocates in a plane parallel to the stationary board;

FIGURE 18B shows the optimum included angle formed by the two pins when engaged for maximum effectiveness when the movable board reciprocates in a plane perpendicular to the plane of the stationary board;

FIGURE 19 is a fragmentary section of one modification of the pins used in this board;

FIGURE 20 is a fragmentary view of a pin connected to a lead;

FIGURE 21 is a sectional fragmentary view a portion of the pin broken away to illustrate means for locking the pin in the board;

FIGURE 22 illustrates diagrammatically one type of cam assembly which could be utilized to reciprocate the movable board in a plane vertical to the horizontal board to obtain double wipe;

FIGURES 23 and 24 are diagrams illustrating various ways of mounting opposed bent pins with respect to each other when the movable board is reciprocated in a plane parallel to the stationary board.

Figure 1:
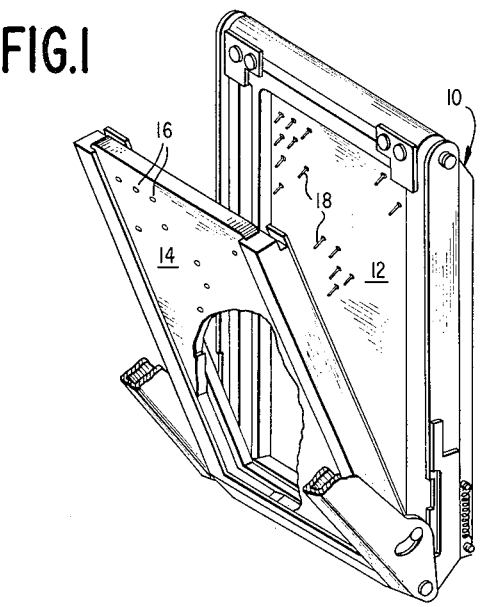
FIGURE 1 is a perspective view of the plugboard assembly with certain parts being broken away for the purpose of clarity.

In FIGURE 1, a plugboard assembly 10 as described in detail in Sitz Patent 2,927,295 is provided with a stationary board 12 and a movable board 14. Both boards are provided with a series of pinholes 16 for mounting pins 18 therein. The boards 12 and 14 are readily removable from the assembly 10. Though the board 14 is first brought toward board 12, engagement of the pins of board 12 with the pins of board 14 is by a reciprocation of the movable board 14 in a plane parallel to the board 12 as described in Patent 2,927,295.

Figure 2:
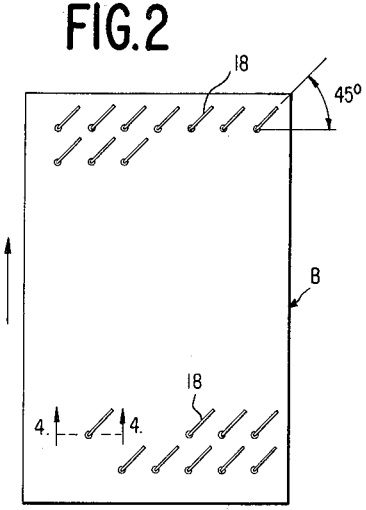
FIGURE 2 is a top plan view of one of the boards used in the assembly.
Figure 3:
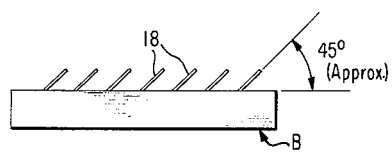
FIGURE 3 is a side elevation of a board such as illustrated in FIGURE 2.

FIGURES 2 and 3 illustrate a board B which could be used either as the stationary or as the movable board. As noted, the pins are set in the board and a portion of each pin projecting therefrom, as illustrated, is set at an angle of 45° with respect to the direction of travel as indicated by the arrow. The set of the pin with respect to the direction of travel can vary considerably as illustrated in FIGURE 18A where the operable angle of set is between 5° and 175°. It will be obvious, that the more parallel the set of the pin with respect to the line of travel the more accurate will have to be the positioning of the pins and the set therein and the more likelihood of poor contact as will be hereinafter explained.

FIGURE 3 illustrates how the portion of the pin extending from the board projects at an angle of 45° with respect to the plane of the board B. The angle may vary considerably from 0° with respect to the plane of the board to approximately 85°. If the pin should project perpendicular with respect to the plane of the board, contact would be for all practical purposes very poor. An angle preferably less than 85° would be preferred in order to provide a good contact as will be hereinafter described.

Figure 4:
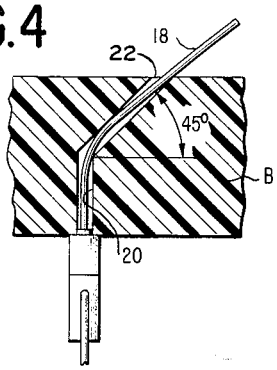
FIGURE 4 is a fragmentary sectional view of a board showing a pin mounted therein.

FIGURE 4 illustrates how the pin 18 would be inserted into the board in order to provide the necessary angle. It is important that the pin 18 be flexible in order to operate as illustrated. The general principle of locking the pin in the board by making the diameter of the pin 18 slightly less than the diameter hole 20 is discussed in detail in my copending application Serial No. 247,164 filed December 26, 1962.

Figure 5:
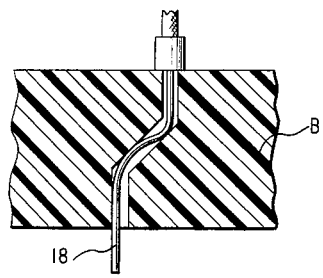
FIGURE 5 is a fragmentary sectional view showing another manner of mounting a pin in a board.

FIGURE 5 illustrates the manner of locking the pin 18 in the board B by means of the teaching of my aforementioned application in a manner so as to have the pin 18 project substantially perpendicular to the plane of the board B.

Figure 6:
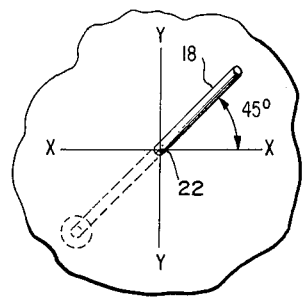
FIGURE 6 is a top plan view of a fragment of the board shown in FIGURE 4 showing the relationship of the pin with respect to the $x$ and $y$ coordinates of the board.

FIGURE 6 is illustrative of the manner in which the pin of FIGURE 4 projects through the board and at an angle to the direction of travel as illustrated by the $x$ and $y$ coordinates. The $y$ coordinate reflects the direction of travel as illustrated in FIGURE 2.

The board B may be constructed of any suitable non-conductive material and may be molded with the plug holes formed therein or may subsequently be drilled as generally described in my copending application Serial No. 247,164.

The pins 18 may be of very fine wire and in any event are generally of uniform diameter with respect to the projecting portion. The flexibility and resiliency of the wire will determine the adequacy of the contact. It is recommended that the spring contact pins be sufficiently resilient to flex when engaged with their mating pins but to nevertheless be capable of maintaining their resiliency.

It will be obvious that the bend in the pin can be produced after the pin has been inserted into the board. The bend need not be made at the point 22 where the pin 18 projects outwardly from the pinhole 20 but may be bent at a distance from the surface of the board B.

FIGURE 22 illustrates pins which are provided with an extension which has a vertical shank with a bent end portion. It is obvious that all of the pins could be bent simultaneously after insertion into the board by a die crimper engaging simultaneously each of the pins.

*Operation of planar reciprocating board*

FIGURES 7 through 14 graphically illustrate the action of the pin $p'$ of one board with the pin $p''$ of the second board. It is immaterial whether the pin $p'$ or the pin $p''$ is the moving pin. For the sake of illustration, the drawing show pin $p'$ to be the stationary pin and pin $p''$ to be the movable pin.

Figure 7:
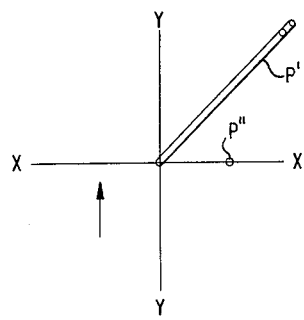
FIGURES 7 through 14 are diagrams of the contact assembly as the contacts move into engagement.
Figure 8:
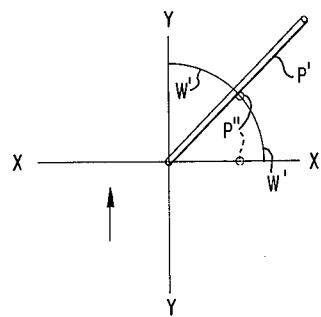

The arrows indicate the direction of travel of the pin $p''$. In FIGURES 7, 8, 9 and 10, the pins are shown with respect to the $x$ and $y$ coordinates. In FIGURE 7, both pins $p'$ and $p''$ are out of engagement with one another. Upon forward movement of the movable board with respect to the stationary board, pin $p''$ will move from the dotted position as illustrated in FIGURE 8 to the solid line position in contact with pin $p'$.

Figure 9:
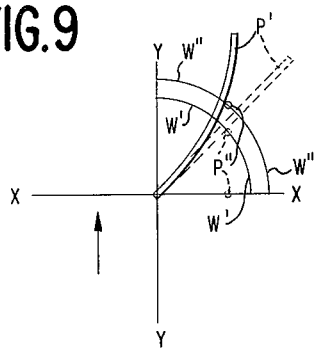

Further movement of the pin $p''$ from the dotted line position in FIGURE 9 to the solid line position will flex pin $p'$ from the dotted line position as illustrated to the solid line position. It will then be obvious that pin $p''$ will have wiped along pin $p'$ the area of $w'$ through $w''$ on pin $p'$. When the past-dead center mechanism as described in Patents 2,927,295, 2,882,508 and 2,975,395 returns pin $p''$ a part of the way back towards its original position on contact $p'$ as illustrated in FIGURE 8, the pin $p''$ will now be returned to the position of wipe in FIGURE 10 which is intermediate between the positions illustrated in FIGURES 8 and 9. The area of wipe will now be from $w''$ to $w^3$. And the pin will have flexed from the dotted line positions illustrated to the solid position shown in FIGURE 10. It will now be obvious that the pin $p''$ will have wiped that portion of pin $p'$ between $w''$ and $w^3$ twice. This double-wipe is quite necessary in order to clear dirt and the like from the contact surface in order to assure positive contact engagement at all times.

If now we consider the pins $p''$ and $p'$ with respect to the $x$ and $z$ coordinates, we will view the pin $p''$ as moving from left to right in the drawings.

Figure 11:
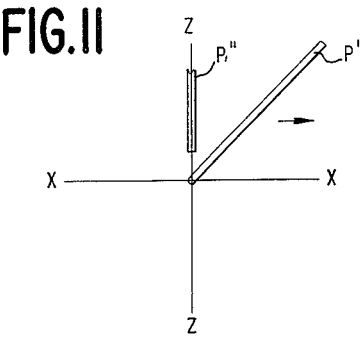
Figure 12:
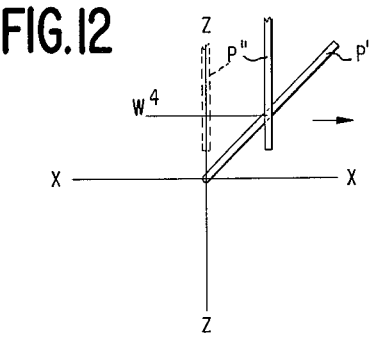
Figure 13:
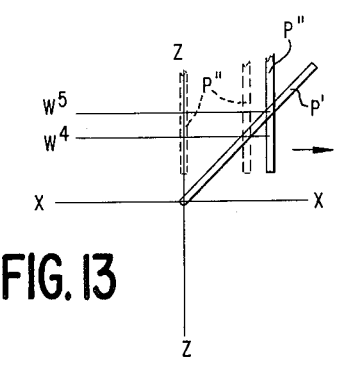

In FIGURE 11 pin $p''$ begins to travel in the direction of $p'$. It engages pin $p'$ at the point $w^4$ on $p'$. FIGURE 13 shows that continued forward motion of the board B will move the pin $p''$ from the dotted line positions to the solid line position and the area $w^4$ to $w^5$ will be wiped along the pin $p''$. When the board B returns slightly because of the past dead center mechanism of the assembly as heretofore mentioned, pin $p''$ will be wiped from $w^5$ to $w^6$ as illustrated in FIGURE 14 and will assume the position shown in the solid lines.

Figure 10:
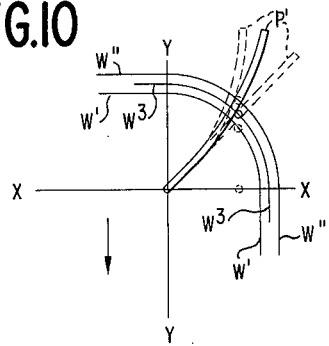
Figure 14:
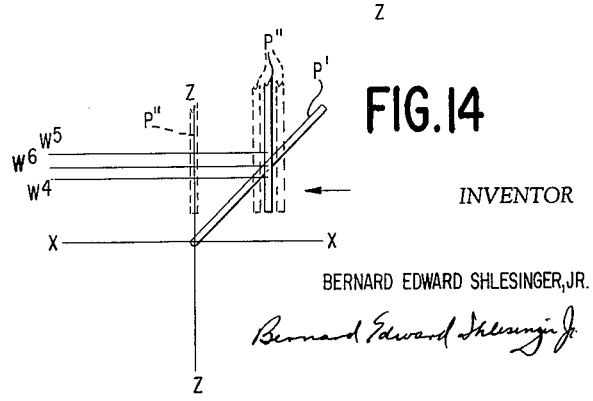

The travel in FIGURES 7, 8, and 9, 11, 12 and 13 is in a forward direction as illustrated by the arrows and the travel in FIGURES 10 and 14 is in a rearward direction as illustrated by the arrows. It will now be obvious that the pin $p'$ is wiped twice in one area as well as the pin $p''$. It will be further obvious that only one of the pins need be fixed in order to perform the wiping action. It is therefore obvious that one of the contact pins may be made of rigid material since it need not have any flexing aspect thereto in order to provide the wipe heretofore described. It is further obvious that both pins may be of resilient spring-like material and both may flex to a certain degree. If both of the pins are of the same type resilient material, it will be obvious that the area of wipe will not be nearly as large as would occur if one of the pins is relatively rigid. The reason of course being that both pins will flex equally and the distance of wipe will be approximately half that illustrated in the drawings when one pin is maintained rigid in its path of travel.

*Modification-movable board reciprocating in a plane vertical to the plane of the stationary board*

FIGURES 15, 16 and 17 diagrammatically illustrate the relationship of two boards B1 and B2 and their pins 30 and 32 respectively.

Board B1 is the moving board and board B2 is the stationary board. It is to be noted that the board B1 moves in a plane vertical to the board B2 as illustrated in FIGURES 16 and 17. FIGURE 15 shows the boards in side-by-side relationship to illustrate the manner in which the pins 30 and 32 are set with respect to each other. In this modification, both the pins 30 and the pins 32 are bent with respect to the plane of the boards. A portion of the projecting pin may be bent or the entire projecting portion as illustrated in the FIGURES 16 and 17.

For operation of an assembly where the moving board reciprocates in a plane vertical to the stationary board, it is essential that both sets of pins be bent at an angle to the plane of their respective boards. FIGURE 18B illustrates the angle at which the pins 30 and 32 must engage in order to provide effective contact. Though the included angle formed by the intersection of the two bent projecting portions of the pins 30 and 32 may vary from 5° to 85°, it is recommended for maximum effectiveness that the included angle be in the range of from 30° to 60° preferably. It will be obvious that as the angle increases from 60° or decreases from 30°, there will be more likelihood that the contacts will not be properly made. As the angle increases towards 90°, the pins will contact at right angles and in the case where one pin is rigid and the other pin is flexible, only one pin will be double wiped. Where the pins are both flexible, wiping will take place on both pins.

*Pin modification*

In FIGURE 19, the pin 40 is provided with a reverse bend 42. This type of configuration may be utilized instead of a straight type pin previously illustrated. A pin of this type may have certain advantages particularly if space is a consideration as the contact portions of the pin may be brought closer to the surface of the board.

FIGURE 20

FIGURE 20 illustrates how the lead 50 may be crimped by means of a crimp sleeve 52 to the pin member 54.

FIGURE 21

FIGURE 21 shows a lead 60 having a crimped sleeve 62 connected to a pin 64. Recesses 66 are used to lock the pin in the sleeve 68 in the board B. Fingers 70 in the sleeve 68 ride in the recesses 66 to provide locking means for maintaining the pin 64 in the board B.

FIGURE 22

FIGURE 22 shows a typical reciprocating type of assembly which might be used for the boards illustrated in FIGURES 15, 16 and 17. The assembly A is provided with a stationary board 70 and a movable board 72. Movable board 72 is mounted for reciprocation on supports 74 and 76. Springs 78 and 80 bias the movable board 72 from the stationary board 70. Sleeves 82 and 84 mounted on supports 74 and 76 limit the movable board 72 in its upward travel. Adjustment screws 86 and 88 permit the movable board 72 to be raised and lowered selectively with respect to the stationary board 70. A cam support 90 secured to the sleeves 82 and 84 is provided with a pivoted cam member 92 which rocks about a pivot 94 and is operable by means of a cam lever 96.

When the cam lever 96 is raised, the cam 92 depresses the movable board 72 and brings the pins 100 into engagement with the pins 102. The cam 92 is so constructed as to move the board 72 initially downward and subsequently upward to a small increment upon continued pull on the handle 96. It is to be noted that the pins 100 have a bend at the end thereof 104.

FIGURES 23 and 24

FIGURES 23 and 24 diagrammatically show from above the positions which the stationary pin 110 can take with respect to the movable pin 112 when the movable board (not shown) reciprocates in a plane parallel to the plane of the stationary board B. The direction of travel of the movable board is illustrated by the arrows.

In these modifications, it is to be noted that both the pins 102 of the stationary and the pins 100 of the movable board are bent for contact engagement. The action is substantially as illustrated in FIGURES 7 through 14.

While the invention has been described, it will be understood that it is capable of further modifications and this application is intended to cover any variations, uses or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A plugboard comprising a fixed board and a movable board disposed substantially in parallel spaced relation, each board having a plurality of pins of uniform diameter arranged in rows and columns, the pins of said fixed board having portions mating with portions of the pins of said movable board, the pins of one of said boards having their contact axes fixed at an angle of from 5° to 85° with respect to the plane of said one board, the orthogonal projection of the contact axis of each pin on said one board forming an angle of from 5° to 175° with the X axis, said axis being a line parallel to said rows, the pins of said other board being angled with respect to the pins of said one of said boards, and the pins of one of said boards being in the path of travel of the pins of the other of said boards when the movable board is moved into pin mating engagement thereby causing wiping contact to be made between said mating pins.

2. A plugboard assembly having a fixed board and a movable board parallelly disposed in spaced relation with respect to each other, said boards having at least one cooperating pair of contact pins extending therefrom, said contact pins being of uniform diameter and having free ends, said free ends each including a contact portion having an upper and lower end, the upper ends of said contact portions of a cooperating pair of contact pins being spaced from each other at all times, the lower ends of said contact portions of said cooperating pair of contact pins being spaced from each other at all times, the upper end of one contact portion of one pin in one contact pair being offset with the lower end of the contact portion of the other contact pin in said pair, at least one contact portion of a cooperating pair projecting at an angle with respect to the line of travel of the movable board, the pins of one of said boards being in the path of travel of the pins in the other of said boards, and said contact portions of said pair being angularly disposed with respect to each other, and at least one of said pins being of resilient material, whereby when said movable board is moved with respect to the stationary board, the pins of the movable board are moved towards the pins of the stationary board and said contact portions are moved into wiping engagement so as to wipe an area on each pin of the pair when said resilient pin flexes against the other pin of said pair.

3. A plugboard assembly as in claim 1, and wherein said movable board is reciprocable in a plane substantially parallel to said fixed board.

4. A plugboard assembly as in claim 1, and wherein said movable board is reciprocable in a plane substantially perpendicular to said fixed board.

5. A plugboard assembly as in claim 1, and wherein all of said pins are of resilient spring material.

6. A plugboard assembly as in claim 1, and wherein at least one of said boards includes pin deflecting locking means.

7. A plugboard assembly as in claim 2, and wherein at least one of said boards includes pin deflecting means.

8. A plugboard assembly ass in claim 2, and wherein said movable board is reciprocable in a plane substantially parallel to said fixed board.

9. A plugboard as in claim 2, and wherein said movable board is reciprocable in a plane substantially perpendicular to said fixed board.

10. A plugboard for use in a plugboard assembly as in claim 2, and wherein said angled contact portion extends at an angle with respect to the plane of said board of between 5° and 85°.

11. A plugboard for use in a plugboard assembly as in claim 2, and wherein said angled contact portion extends at an angle with respect to the plane of said board of about 45°.

12. A plugboard for use in a plugboard assembly as in claim 2, and wherein said angled contact portion extends at an angle with respect to the plane of said board of from between 5° and 85°, and with respect to the line of travel of said board of from between 5° and 175°.

13. A plugboard assembly as in claim 1, and wherein the mating portions of said pins of said stationary and movable boards project angularly forward and generally toward the line of travel of said board.

14. A plugboard assembly as in claim 1, and wherein the mating portions of said pins of said stationary and movable boards project angularly rearward and generally away from the line of travel of said board.

15. A plugboard assembly as in claim 1, and wherein the mating portions of said pins of one board project angularly forward and generally toward the line of travel of said board and the contact portions of said pins of said other board project angularly rearward and generally away from the line of travel of said board.

16. A plugboard assembly as in claim 1, and wherein said mating portions are angularly disposed with respect to each other to form an acute angle of not more than about 30°.

17. A plugboard assembly as in claim 2 and wherein one of said pins has a reverse bend therein.

References Cited by the Examiner

UNITED STATES PATENTS

| | | | |
|---|---|---|---|
| 1,553,313 | 9/25 | Goff | 317—112 X |
| 2,111,118 | 3/38 | Lake. | |
| 2,594,748 | 4/52 | Earl | 339—18 |
| 2,742,534 | 4/56 | Martin et al. | 179—27.54 |
| 2,769,880 | 11/56 | Holmqvist et al. | 179—27.54 X |
| 2,882,508 | 4/59 | Watts | 339—18 |
| 2,927,295 | 3/60 | Sitz | 339—18 |
| 2,975,395 | 3/61 | Sitz | 339—18 |

FOREIGN PATENTS 1,041,054 5/53 France.
126,422 10/49 Sweden.

JOSEPH D. SEERS, *Primary Examiner.*

PATRICK A. CLIFFORD, *Examiner.*